United States Patent

[11] 3,612,884

| [72] | Inventors | Stathis G. Linardos<br>Clearwater;<br>Richard F. Elmhurst, Largo; William A.<br>Elmhurst, Largo, all of Fla. |
|---|---|---|
| [21] | Appl. No. | 803,249 |
| [22] | Filed | Feb. 28, 1969 |
| [45] | Patented | Oct. 12, 1971 |
| [73] | Assignee | The Eastern Company<br>Portland, Maine |

[54] FAIL-SAFE PHOTOELECTRIC CONTROL SYSTEM
8 Claims, 3 Drawing Figs.

[52] U.S. Cl. ..................................................... 250/214,
250/222, 307/202, 317/124, 317/127
[51] Int. Cl. ....................................................... G02f 1/28
[50] Field of Search........................................... 250/222,
214; 307/202, 217; 317/124, 127

[56] References Cited
UNITED STATES PATENTS

| 3,131,332 | 4/1964 | Guri ............................ | 317/124 X |
| 3,242,341 | 3/1966 | Woodward .................... | 250/221 |
| 3,329,946 | 7/1967 | Robbins ....................... | 250/221 X |
| 3,336,510 | 8/1967 | Itoh ............................. | 317/124 |
| 3,348,104 | 10/1967 | Zielinski et al. .............. | 317/124 |

OTHER REFERENCES
Goldstein, T., " Redundant Circuit Design," E.E.E., April 1963, pp. 79– 82.

Primary Examiner—James W. Lawrence
Assistant Examiner—D. C. Nelms
Attorney—Stefan M. Stein ABSTRACT: A fail-safe photoelectric control system for disconnecting a load whenever an object is sensed by one of two or more photocells. A transistorized gating circuit is connected to the photocells and to a square-wave output signal of a signal generator. Under normal conditions, the gating circuit passes the signal which is then amplified and rectified before energizing a relay which connects the load. When an object is in the light path of either photocell, or if any active component in the system fails, the signal is blocked whereupon the relay is deenergized and the load disconnected.

PATENTED OCT 12 1971

INVENTOR.
STATHIS G. LINARDOS
RICHARD F. ELMHURST
WILLIAM A. ELMHURST
BY

FAIL-SAFE PHOTOELECTRIC CONTROL SYSTEM

This invention relates generally to a fail-safe photoelectric control system; more particularly, to a fail-safe photoelectric control system having a plurality of photocells wherein a load is rendered inoperative when either of the photocells senses an object.

It is well known to utilize a photoelectric system as a safety device for inherently dangerous machinery. This system is usually incorporated into the machinery to render it inoperative when an object, for example a hand, is in the light path of the photocell. Frequently, it is desirous to have two or more photocells stationed in strategic areas about the machinery to stop the machinery when an object is in the path of either photocells.

One such machine or apparatus in which a photoelectric control system having two or more photocells is required is a rotary file. Rotary files are now in common usage and generally include a rotatably mounted drum or endless conveying means having a plurality of shelves pivotally supported around the circumference thereof. Usually, card file trays are carried within the cradles. A cabinet encloses the apparatus. To examine a given card, an operator rotates the rotary file until the cradle carrying the tray in which the desired card is located is at a selected position corresponding to an opening in the cabinet. In some units, this position is selected automatically. That is, the operator presses a button corresponding to a desired cradle whereupon the rotary file rotates automatically and stops at the selected position.

A dangerous operator problem has been discovered in operating these rotary files. Occasionally, an operator will try to remove a file card while the rotary file is still rotating. Since the cabinet is only open at the selected position, if the operator is inattentive his hand can be swept with the cradle past the cabinet opening and dragged inside the cabinet whereupon a loss of a limb or other serious physical injury occurs. To prevent this, a photoelectric control system is usually incorporated into the rotary file. Photocells of the system are placed to scan the cabinet opening. If an operator places his hand within the cabinet while the file is rotating, and if his hand is swept upwardly, it will pass in a light path of one of the photocells whereupon the photoelectric system stops the rotation of the file. Since the rotary file may rotate downwardly as well as upwardly, it has been found to be necessary to install at least two photocells in the opening: one adjacent the upper portion of the opening and one adjacent the lower portion. The photocell across the lower portion prevents a person's hand from being caught between the cabinet and the rotary mechanism and being dragged downwardly. It should be readily understood that since the photoelectric system is designed to be a safety device, it should be substantially fail-safe.

Unfortunately, previous fail-safe photoelectric control systems for two or more photocells have not been satisfactory. Photocells of previous systems are usually connected to a balance coil. If the light on both photocells is the same, the coil is balanced, and the circuit is closed to energize the controlled apparatus. Conversely, if the light on any photocell is different as, for example, when a hand is in the light path of one photocell, the coil is unbalanced and the circuit is opened. The problem of using the balance coil is that the system is undesirably susceptible to small variations in light intensity on the photocells caused by dust on the lens, beam alignment, beam focus, bulb life, etc. That is, if more light is on one photocell than on the other due to these small variations, the coil becomes unbalanced and the circuit opens even though there is no object present in the path of any photocell. In an attempt to remedy this problem, the balance coil is provided with a rheostat whereby the coil is adjusted according to the variations of light intensity on the photocells. However, this is still not satisfactory as constant adjustment of the rheostat by unskilled operators is necessary for satisfactory operation. Other disadvantages of this and other previous photoelectric fail-safe systems are that they utilize an unduly number of components, they are usually not compact and they are unduly complicated making them expensive to manufacture.

Accordingly, it is an object of this invention to provide a solid-state, fail-safe photoelectric control system.

Another object is to provide a fail-safe photoelectric control system which will not be affected by small variations of light intensity on the photocells.

Still another object is to provide a fail-safe photoelectric control system for disconnecting a load when any of a multiple number of photocells detect an object.

A further object is to provide a fail-safe photoelectric control system having a transistorized gating circuit which transmits a pulse signal when an object is not sensed by a photocell, and blocks the signal when an object is sensed.

A still further object is to provide a fail-safe photoelectric control system which will be uneffected by fluctuation in voltage of an AC power source.

Another object is to provide a fail-safe photoelectric control system which renders a load inoperative in the event of failure of any photocell.

Another object is to provide a fail-safe photoelectric control system which renders a load inoperative whenever any active component in the system fails.

Another object is to provide a fail-safe photoelectric control system which will prevent a load from being operative when an object is being detected by a photocell in the case that any single inactive circuit component should fail.

Another object is to provide a fail-safe photoelectric control system which is compact, simple in construction, economical in cost, reliable in operation and practical to manufacture.

Other objects of the invention will in part be obvious and will in part appear hereinafter.

In accordance with these objects, the fail-safe photoelectric control system comprising this invention generally includes an AC to DC input rectifier for providing a full-wave DC voltage to operate the system; a signal generator for providing a pulse signal; two or more photocells for sensing an object; a detector for each photocell comprising a transistorized gating circuit for transmitting the signal when an object is not sensed by any photocell; an amplifier for amplifying the pulse signal transmitted by the detectors; a decoupler for transmitting only the amplified pulse signal; an output rectifier for rectifying the signal transmitted through the decoupler; a voltage regulator for regulating the output voltage of the rectifier; and a relay for operating a mechanism controlled by the system. The essence of the system is that under normal conditions a square wave or ripple voltage pulse signal from the signal generator is transmitted through the detectors, amplified, transmitted through the decoupler, and then rectified to energize the relay. Whenever an object is sensed by any photocell or whenever any of the active components in the system fails, the pulse signal is blocked. As a consequence, a constant DC voltage appears at the decoupler and is not transmitted to the relay. The relay is then deenergized and he mechanism disconnected. A zener diode is placed in parallel with the relay to regulate the voltage across the relay.

The photoelectric control system is preferably utilized in combination with a rotary file for preventing an injury to an operator.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which.

Similar reference characters refer to similar parts throughout the several views of the drawing.

Figure 1:
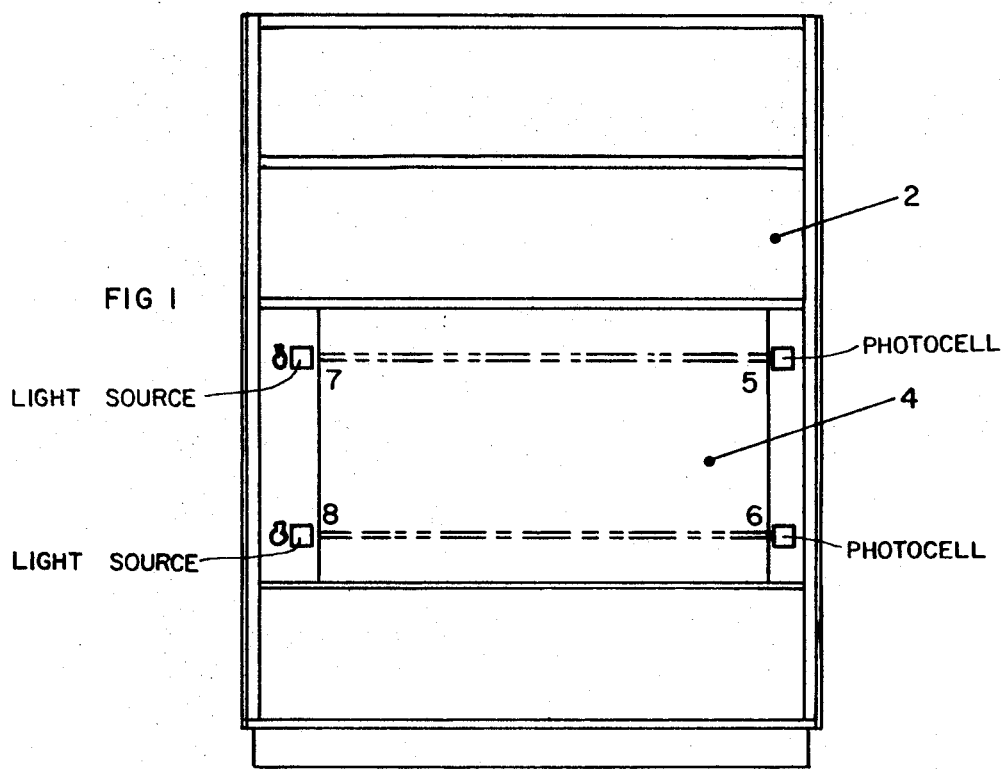
FIG. 1 is a front elevation view of a rotary file unit in combination with the photoelectric control system of the instant invention.

Referring now to the drawings in detail, there is illustrated in FIG. 1 a front elevation view of a rotary file generally designated as 2. Although a rotary file is a preferred mechanism to be utilized with the photoelectric control system of this invention, the system is not intended to be limited to a rotary file but may be combined with other mechanisms as well. Scanning an opening of the file is a pair of photocells 5 and 6, of the photoelectric control system, receiving light from respective light sources 7 and 8. As will become apparent, when an object, such as a hand, is in the light path of either photocell, the rotary file is deactuated.

Figure 2:
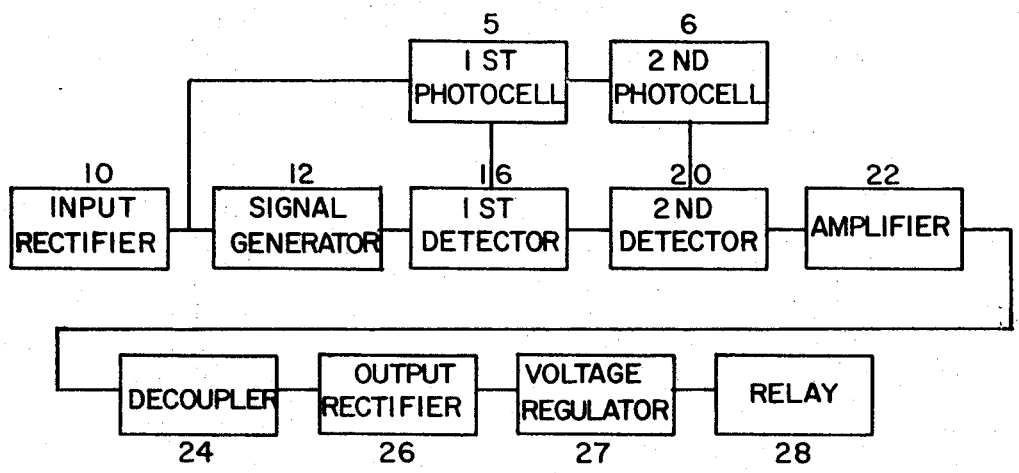
FIG. 2 is a block diagram of the electrical circuitry of the invention.

There is illustrated in FIG. 2 a block diagram of the photoelectric control system. As illustrated, the system includes an input rectifier 10 for for changing an AC source voltage to a rectified DC voltage for operating the system; a signal generator 12 for producing a square-wave signal; first photocell 5 for sensing an object; a first detector 16 for detecting a presence of an object sensed by the first photocell; second photocell 6 for sensing the presence of an object; a second detector 20 for detecting the presence of an object sensed by second photocell 6; an amplifier 22 for amplifying a square-wave signal transmitted through detectors 16 and 20; a decoupler 24 for transmitting only the square-wave signal; an output rectifier 26 for rectifying the square signal transmitted by decoupler 24; a voltage regulator 27 for regulating the output voltage of rectifier 26; and a relay 28 for operating the rotary file when energized by the rectified signal.

As stated, the essence of the photoelectric control system is that under normal conditions a square-wave signal from the signal generator is transmitted through the detectors, amplified, transmitted through the decoupler, and then rectified to energize the relay. Whenever an object is sensed by either photocell or whenever any one of the active components or photocells in the system fails, the pulse signal is not transmitted to the decoupler. As a consequence, a constant DC voltage appears at the decoupler and is not transmitted to the relay. The relay is then deenergized and the rotary file 2, or other mechanism is deactivated.

Figure 3:
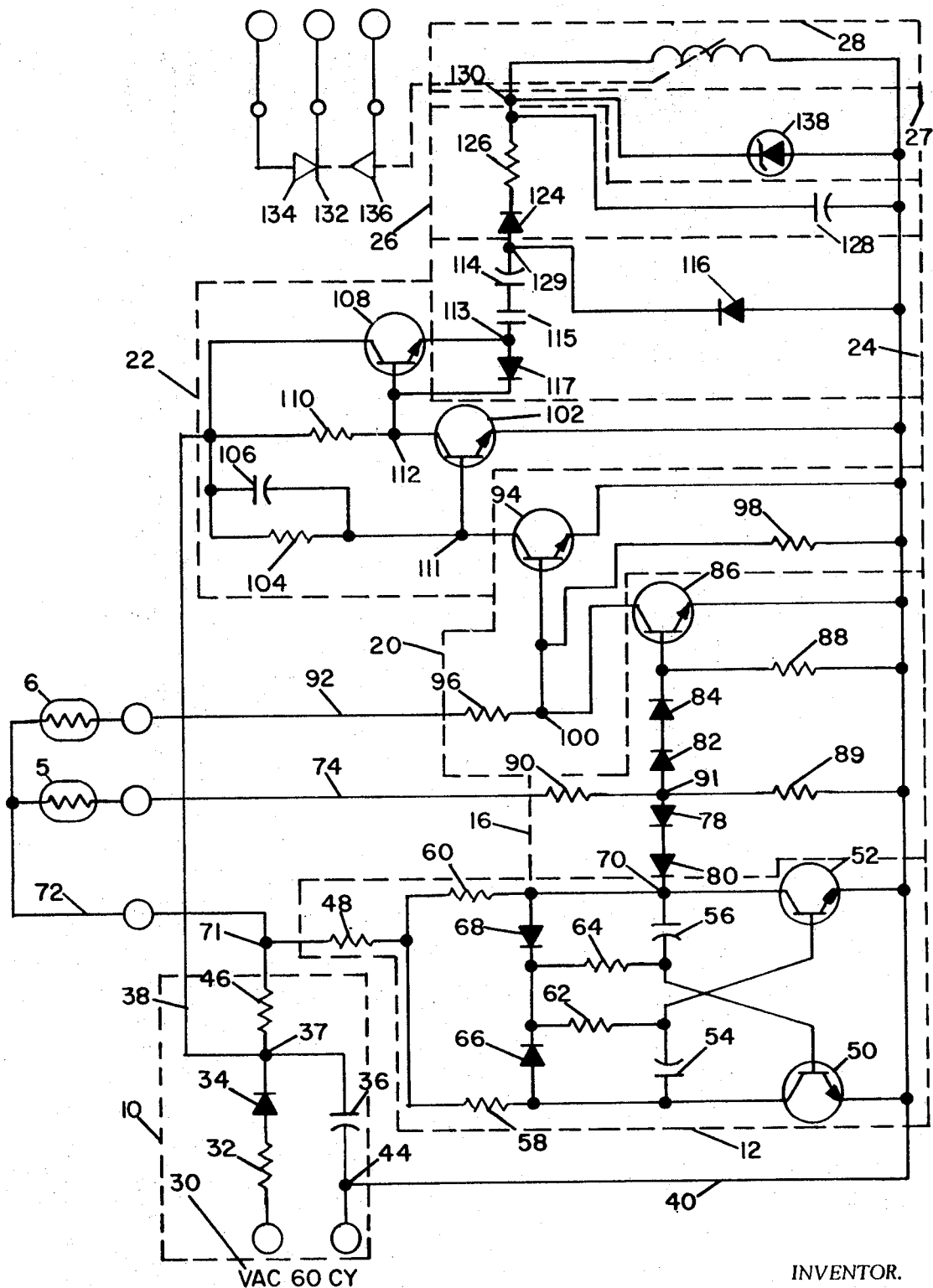
FIG. 3 is a schematic circuit diagram of the photoelectric control system.

The system will now be described in more detail by referring to FIG. 3. The rectifier 10 rectifies a 60 cycle AC input 30 to a DC voltage for operating the system. Although the system is preferably operated by a 20–30 volt, 60 cycle AC input, this is not critical and the system may be adapted for other voltages and frequencies. The rectifier 10 is conventional and includes a current limiting resistor 32, a silicon rectifier 34 and a capacitor 36. As should be easily understood, capacitor 36 acts as a capacitance input filter to provide a DC input at point 37 for operating the system. The positive lead of the system is designated as 38 and the negative lead or ground as 40. The rectifier can be eliminated if a DC voltage source is available. If available, the positive terminal of the DC source would be connected to point 37 and the negative terminal to point 44.

The signal generator 12 is connected between positive lead 38 and ground lead 40 through voltage dropping resistors 46 and 48. The signal generator 12 comprises a free running multivibrator having a pair of NPN transistors 50 and 52. The multivibrator is conventional and includes the additional conventional circuit elements. These elements are cross-coupling capacitors 54 and 56, collector resistors 58 and 60, base resistors 62 and 64 and silicon diodes 66 and 68 which prevent transistors 50 and 52 from simultaneously assuming a saturated state. The emitter terminals of transistors 50 and 52 are connected to the ground lead 40.

The operation of the multivibrator signal generator 12 is well known by those skilled in the art. To not unduly hinder the reading of this application, only a terse summary of its operation will be given. One of the transistors of the multivibrator is normally conducting while the other transistor is cut off. The conducting transistor conducts until a potential charge on the cross-coupling capacitor reaches a given level which is sufficient to drive the cut off transistor into conduction. When the cut off transistor begins to conduct, the previous conducting transistor cuts off. This action is repeated such that as transistor 52 conducts and cuts off an alternating voltage, more particularly designated as a square wave, pulse signal, is produced at output 70. The frequency of the square-wave pulse is determined by the time constant of capacitors 54, 56 and associated resistors 58, 60, 62, 64, and 48. The amplitude of the square wave is approximately between zero volts when transistor 52 is conducting and some fraction of the DC voltage appearing at point 71 when transistor 52 is cut off.

The first and second photocells 5 and 6 are connected to point 71 through lead 72. The photocells are the customary photoconductive elements which produce a high resistance under dark conditions. These photoconductive elements are well known and any of several types may be utilized. The preferred type is a photoconductor manufactured by Clairex Electronic and designated CL 907H. These particular photoconductive elements are made of cadmium sulfide.

The first photocell 5 is connected to the first detector 16 through lead 74. The components of the first detector comprise a transistorized gating circuit and include first and second germanium diodes 78, 80, first and second silicon diodes 82, 84, NPN transistor 86, resistors 88, 89 and base resistor 90 for limiting current to and protecting transistor 86. Point 91 is connected to the signal output 70 of the signal generator 12 through the first and second germanium diodes 78 and 80, their cathodes facing the signal generator. These diodes prevent DC current from flowing through collector resistor 60 to the gating circuit of the first detector 16 when transistor 52 is nonconducting or cut off. The diodes are employed in a dual redundant relationship. That is, two diodes are utilized in the place of a single diode as a safety factor in providing a reliable system. If one of the diodes should fail, the other diode will still function to block the current. This is essential to the fail-safe nature of the circuit. It will be obvious that in order to produce a safe system it is important that the only source of current for the base of transistor 86 is through photocell 5 and that any current through resistor 60 be prevented from flowing to point 91 by diode 78 or diode 80.

Point 91 is also connected to the base of transistor 86 through silicon diodes 82 and 84, their cathodes being toward the base of transistor 86. The collector terminal of transistor 86 is connected to the second detector 18 and the emitter terminal to ground lead 40. Diodes 82 and 84 are employed to produce a threshold voltage which will prevent current passing through photocell 5 from flowing into the base of transistor 86 when transistor 52 is conducting. As should be obvious, current is prevented from flowing into the base of transistor 86 when transistor 52 is conducting due to the fact that the threshold voltage produced by silicon diodes 82 and 84 and the base-emitter junction of transistor 86 is greater than the voltage produced by germanium diodes 78 and 80 and the collector-emitter voltage of transistor 52.

When photocell 5 is not sensing an object and light is received on the photoconductive element, the resistance of the photocell is lowered and DC current flows through the photocell to point 91. From point 91, the current flows either to transistor 52 or to the base of transistor 86 depending on the square-wave pulse signal produced at point 70. When transistor 52 is conducting the DC current flows through diodes 78, 80 and through transistor 52 to ground lead 40. When transistor 52 is cut off, the current flows through silicon diodes 82, 84 to the base of transistor 86 causing transistor 86 to conduct. Therefore, transistor 86 is in a conducting state when transistor 52 is cut off and is cut off when transistor 52 is conducting. As transistor 86 alternately conducts and cuts off, it, in effect, transmits the square-wave signal at point 70 to the second detector 20.

Conversely, when an object, such as a hand, is present in the light path of photocell 5, the resistance of the photoconductive element substantially increases. This prevents any effective current from flowing through the photocell to the base of transistor 86. Therefore, transistor 86 remains in a nonconductive state and blocks the pulse signal. The signal is therefore not transmitted by transistor 86 to the second detector 18. Consequently, as will hereinafter be more fully described, relay 28 is de-energized and the rotary file disconnected or stopped. Point 91 is connected to ground lead 40 through resistor 89 to insure that any leakage current passing through photocell 5, when sensing an object, will not be sufficient to flow past silicon diodes 82 and 84 to the base of transistor 86 to cause this transistor to conduct. To prevent transistor 86 from conducting due to intrinsic transistor properties such as leakage currents caused by temperature rises and the like, the base of the transistor is connected to ground lead 40 through resistor 88. This provides a current drain for any voltage built up on the base.

The second photoelectric cell 6 is connected to the second detector 20 through lead 92. The second detector comprises a transistorized gating circuit which includes an NPN transistor 94, a base resistor 96 for protecting transistor 94 against excessive current, and resistor 98. The emitter terminal of transistor 94 is connected to ground lead 40 and the collector terminal of transistor 94 is connected to amplifier 22.

Assuming that an object is not in the light path of photocell 6, the resistance of the photoconductive element is low and a relatively high current is passed through the photocell to point 100. If a light source is also falling on photocell 5, as previously described, transistor 86 conducts and cuts off in response to the square-wave signal of the signal generator 12. When transistor 86 is conducting, current flows from point 100 through transistor 86 to ground lead 40. When transistor 86 is cut off, the current flows from point 100 to the base of transistor 94 causing transistor 94 to conduct. Thus, transistor 94 is conducting when transistor 86 is cut off and transistor 94 is cut off when transistor 86 is conducting. The alternate conduction and nonconduction of transistor 94 causes a square-wave signal to be produced at its collector terminal which is subsequently amplified by amplifier 22. In this manner, the square-wave output signal from signal generator 12 is transmitted to the amplifier when all components are operative and when no object is in the light path or sensed by photocells 5 and 6. After being amplified, the signal is rectified and energizes relay 28 as will later be apparent.

It will now be shown that when either photocell is sensing an object, a square-wave pulse signal will not be transmitted to the amplifier, and as a consequence, relay 28 will be de-energized. When an object is in the light path of photocell 6, the current passing through point 100 to the base of transistor 94 will be substantially reduced and insufficient to cause transistor 94 to conduct. Point 100 is connected to ground lead 40 through resistor 98 to insure that transistor 94 does not conduct when an object is sensed by photocell 6. Any leakage current passing through the photocell 6 is passed through resistor 98 as well as any current generated by transistor 94 due to intrinsic effects (i.e. temperature rise). Since transistor 94 is cut off, it block any square-wave signal transmitted by transistor 86. As a consequence, no square-wave signal is transmitted to the amplifier and relay 28 is deenergized The rotary file is then stopped. When an object is in the light path of photocell 5, as previously described, transistor 86 is cut off and blocks the square-wave signal of signal generator 12. Therefore, even assuming an object is not in the light path of photocell 6, the current passing through point 100 will continuously flow to the base of transistor 94. Consequently, transistor 96 remains conductive. Since the square-wave signal is not transmitted to energize the relay, again, the rotary file is stopped.

The function of amplifier 22 is to amplify the square-wave signal transmitted by the second detector 20 to magnitude sufficient to energize relay 28. The amplifier comprises a first NPN transistor 102, a base resistor 104 for limiting current to and protecting transistor 102, a capacitor 106 in parallel with base resistor 104, a second NPN transistor 108, and a base resistor 110 for limiting current to and protecting transistor 108.

As stated, the alternate conduction and nonconduction of transistor 94 causes a square-wave signal at its collector terminal. When transistor 94 is conducting, current flows from lead 38 through resistor 104 to point 11, whereupon it flows through transistor 94 to ground lead 40. When transistor 94 is not conducting, current flows from point 111, the base of transistor 102 causing this transistor to conduct. Transistor 102 alternately conducts and cuts off in response to the transmitted square-wave signal present at point 111, and in doing so produces an amplified square-wave signal at point 112. When transistor 102 is conducting, current flows from lead 38 through resistor 110 to point 112 and from there through transistor 102 to ground lead 40.

The square-wave signal of point 112 is further amplified by transistor 108 which alternately conducts and cuts off in response to the signal. That is, when transistor 102 is conducting, transistor 108 is cut off and when transistor 102 is cut off, transistor 108 is conducting. The alternation of conduction and cutting off of transistor 108 produces an amplified square-wave signal at point 113. When conducting, transistor 108 conducts current from lead 38 to point 113, the input of a decoupler 24.

Decoupler 24 comprises a first and second capacitor 114, 115 and a first and second silicon diodes 116 and 117. Two capacitors are provided to increase the reliability of the system. Should one fail, the other is still operative.

The function of decoupler 24 is to transmit the square-wave signal at point 113 but to block a continuous or unfluctuating voltage whereby relay 28 is only energized when the signal is transmitted by detectors 16, 20 and present at point 113.

This is accomplished in the following manner: When transistor 108 begins to conduct, the voltage at point 113 rises from approximately zero potential to some positive potential causing current to flow through capacitors 114 and 115 into rectifier 26. The current flowing into rectifier 26 builds up a potential charge on capacitor 128 causing relay 28 to actuate. The passing of current through capacitors 114 and 115 leaves a potential charge on these capacitors. The charge is positive at point 113 and negative at point 129. When transistor 108 is nonconducting and transistor 102 is conducting the potential charge on capacitors 114 and 115 is discharged through diodes 116 and 117 and transistor 102 to ground line 40. In short, when a square wave appears at point 113, the positive portion of the square wave passes through capacitors 114 and 115 causing a potential voltage to appear on capacitor 128. The ground or zero potential portion of the square wave allows any unwanted voltage on capacitors 114 and 115 to be discharged.

If a square-wave signal is not present at point 111, transistor 102 remains conductive or nonconductive depending on the state of transistor 94 and transistor 108 remains correspondingly nonconductive or conductive. Therefore, no signal is present at point 113, the voltage at this point remains constant. As should be easily understood, when the voltage is not fluctuating, no current will flow through capacitors 113 and 114 into rectifier 26 to energize relay 28. The rotary file is then stopped.

Provision is also made to prevent the possibility of extrinsic signals being coupled to the system through lengthy cables and being amplified by transistors 94, 102 and 108 to produce an erroneous alternating signal at point 111 which will energize relay 28 even though the photocells are sensing an object and the detectors are blocking the signal from signal generator 12. This is prevented by capacitor 106. Capacitor 106 acts as a low-pass filter. The capacitance of capacitor 106 is chosen to allow the square-wave signal produced at point 111, when both photocells do not detect an object, to pass to transistor 102. For frequencies greater than the square-wave signal produced at point 111, capacitor 106 prevents these frequencies from being amplified by transistor 102 by maintaining the transistor in a continuous state of conduction. Thus, the erroneous signal is not amplified to point 113 and relay 28 is not energized by it.

Output rectifier 26 comprises a silicon diode 124, a current limiting resistor 126 and a filter capacitor 128. This rectifier is conventional and is similar to rectifier 10. It changes the square-wave signal presented at point 129 to a substantially continuous DC signal at point 130 for energizing relay 28. When energized, relay 28 moves contact 132 into engagement with contact 136 to operate the rotary file, and when deenergized, the relay disengages the contacts whereupon the rotary file is stopped.

Importantly, provision is made to allow the AC input 30 to fluctuate without unduly affecting the operation of relay 28. A zener diode 138 is placed across relay 28. The threshold voltage of zener diode 138 is the optimum voltage to operate relay 28. After this voltage is reached, diode 138 breaks down and the voltage across relay 28 remains constant.

This system is fail-safe in that failure of any active element will prevent the square-wave DC signal from being presented at point 113. The relay 28 will then become deenergized and the rotary file stopped. For example, should any transistor in the system become inoperative, the square-wave signal will either not be produced by signal generator 12 or it will be blocked before reaching point 113 depending on which transistor should fail.

The system is also fail-safe in that failure of any single inactive component (resistor, capacitor or diode) will not cause the output relay to fail to deactuate when an object is being detected by a photocell. Because of this requirement, dual-redundant diodes 78 and 80 have been utilized to block the flow of current from resistor 60 to the base of transistor 86 in the event of shorting of either diode 78 or 80. In addition, dual-redundant capacitors 114 and 115 have been utilized to block the flow of DC current from point 113 to rectifier 26 in the event of shorting of either capacitor 114 or 115. The failure of other components may degrade the operation of the system but under no conditions will other inactive component failures cause the output relay to actuate when one of the photocells is sensing an object. This is due to the fact that sensing of an object by a photocell inhibits the square wave from appearing at point 113 regardless of the failures of other components. Once the square wave is inhibited from appearing at point 113, the output relay 28 cannot actuate.

The system is also fail-safe in that failure of any photocell will prevent a signal from appearing at point 113 thus causing relay 28 to deactuate. Should an open occur in either or both photocells 5, 6, current would be prevented from flowing through the opened photocell. Thus, the open photocell would tend to operate in the same manner as a photocell which has an object in front of its light path. That is, the photocell would not transmit current to its corresponding transistor and the transistor would be cut off blocking the square-wave signal. Conversely, if either or both photocells short, excessive currents would flow through line 74 or line 92 causing the DC voltage at point 71 to drop below a point sufficient for generator 12 to function. Thus, no square-wave signal would appear at point 70 to be transmitted to point 113.

Additional photocells and corresponding detector circuit may be added to the system if desired. The additional photocells would be connected to positive lead 72 and a detector similar to second detector 20 would be added for each respective photocell between the present detectors and the amplifier. When additional photocells and detectors are incorporated into the system, it should be evident from the above description that when an object is sensed by any photocell, the square-wave signal will be blocked and the relay 28 would be deenergized.

Conversely, if only one photocell is desired to be utilized, a resistor may be utilized in place of one of the photocells, preferably photocell 6. The resistance of the resistor would be approximately the resistance of the photocell when a light is impinging on it. Therefore, assuming such a resistor was substituted for photocell 6, current would be delivered to transistor 94 to enable it to transmit a square-wave signal appearing at point 100. If preferred, photocell 6 and second detector 20 may be entirely removed from the system and the collector of transistor 86 connected to point 111.

Although the system is shown with the included preferred components, it is to be understood that some of these may be eliminated. As stated, a DC source may be connected to points 37 and 44 in lieu of rectifier 10. Further, an alternating current from an AC source may be substituted as a signal generator instead of the multivibrator for providing an alternating signal at point 70. Moreover, since amplifier 22 is only provided to amplify the signal to a voltage which will be sufficient to operate relay 28, the amplifier can be omitted in those systems utilizing a relay with a low voltage requirement.

Further, although transistors are preferred because they provide a compact, reliable, and economical system, triode tubes may be substituted in their place.

From the above description it should be evident that unlike previous photoelectric control systems utilizing multiple photocells, this system is not effected by slight variations of light intensity on the different photocells caused by dust on the lens, beam alignment, beam focus, bulb life. This system uses a unique transistorized gating circuit for transmitting a square-wave signal when no objects are sensed by the photocells and for blocking the signal when an object is sensed. Means are provided in the system to energize a relay for operating a mechanism only when the square-wave signal is transmitted. Being the system utilizes a minimum number of components, and the components utilized are relatively inexpensive, the system is compact and economical to manufacture. The system is extremely reliable and fail-safe as failure of any active component in the system blocks the transmission of the square-wave signal and the relay is deenergized. Further, the system is fail-safe should the failure of any single passive element (diodes, resistors or capacitors) occur. More specifically, if any single component should open or short the output relay 28 would not fail to deactivate if an object is sensed by either photocell.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A fail-safe photoelectric control system comprising a signal generator for producing a square-wave signal, gating means electrically connected to said signal, a DC source supplying DC current to said gating means, at least one photocell in the path of said DC current, said photocell regulating the DC current to said gating means in response to its detection of light, said gating means transmitting the signal when receiving current from said photocell and blocking the signal when said current is substantially reduced, a rectifier electrically connected to the output of said gating means for rectifying said transmitted signal, and a relay energized by said rectified current when said gating means is transmitting said signal and deenergized when said gating means is blocking said signal.

2. The photoelectric control system of claim 1 wherein said gating means includes transistors which alternately conduct and cut off in response to said square-wave signal, and wherein said system further includes decoupling means electrically connected to the output of said gating means for transmitting the current to said relay only upon receipt of the square-wave signal.

3. The photoelectric control system of claim 2 further including two or more photocells in the path of said DC current, the output of each of said photocells being electrically connected to the base of a corresponding transistor included in said gating means, and said transistors being electrically connected to transmit said square wave signal when all of said transistors are receiving current from their photocells and to block said signal when any one of said transistors is receiving a substantially reduced current from its corresponding photocell.

4. The photoelectric control system of claim 3 further including an amplifier electrically connected between the output of the gating means and said decoupling means for amplifying the square-wave signal transmitted by said gating means.

5. The photoelectric control system of claim 4 wherein said decoupler means includes at least one capacitor between the amplifier output and the rectifier, a first silicon diode electrically connected between the negative terminal of said capacitor and ground, the cathode terminal of said silicon diode facing the capacitor, a second silicon diode having its anode connected to the positive terminal of said capacitor, the output of said amplifier being electrically connected between said second silicon diode and said capacitor, and means to alternately connect the cathode of said second silicon diode to ground in response to said signal.

6. The photoelectric control system of claim 4 wherein said signal generator comprises a unidirectional multivibrator driven by said DC source.

7. The photoelectric control system of claim 12 wherein said DC source is the output of a rectifier having an AC input.

8. The photoelectric control system of claim 7 further including a voltage regulator across said relay, said regulator comprising a zener diode.